United States Patent
Aravkin et al.

(10) Patent No.: US 9,958,829 B2
(45) Date of Patent: May 1, 2018

(54) SENSORY HOLOGRAMS

(71) Applicant: International Business Machines Corporation, Armonk, NY (US)

(72) Inventors: Aleksandr Y. Aravkin, Bronx, NY (US); Lior Horesh, Ossining, NY (US); Raya Horesh, Ossining, NY (US); Dimitri Kanevsky, Ossining, NY (US); James J. Wynne, Mount Kisco, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 441 days.

(21) Appl. No.: 14/271,551

(22) Filed: May 7, 2014

(65) Prior Publication Data
US 2015/0323991 A1    Nov. 12, 2015

(51) Int. Cl.
| H04N 5/89 | (2006.01) |
| G03H 1/22 | (2006.01) |
| G06F 3/01 | (2006.01) |
| G01B 11/14 | (2006.01) |
| G03H 1/00 | (2006.01) |
| G06T 7/70 | (2017.01) |

(52) U.S. Cl.
CPC .......... G03H 1/2249 (2013.01); G01B 11/14 (2013.01); G03H 1/0005 (2013.01); G03H 1/22 (2013.01); G06F 3/016 (2013.01); G06F 3/017 (2013.01); G06T 7/70 (2017.01); G03H 2001/0061 (2013.01); G03H 2001/226 (2013.01)

(58) Field of Classification Search
None
See application file for complete search history.

(56) References Cited

U.S. PATENT DOCUMENTS

| 4,930,505 A  * | 6/1990 | Hatje | A61N 5/0618 606/3 |
| 5,452,314 A  * | 9/1995 | Aronson | G02F 1/125 359/308 |
| 2007/0195294 A1* | 8/2007 | Willey | G03B 21/26 353/119 |
| 2009/0237763 A1* | 9/2009 | Kramer | G03H 1/0005 359/23 |

(Continued)

FOREIGN PATENT DOCUMENTS

| CN | 101739171 | 11/2008 |
| CN | 101616214 | 12/2009 |

OTHER PUBLICATIONS

Hoshi et al., "Adding Tactile Reactoin to Hologram", Oct. 2, 2009, IEEE International Symposium on Robot and Human Interactive Communication, pp. 7-11.*

(Continued)

Primary Examiner — James M Anderson, II
(74) Attorney, Agent, or Firm — Daniel P. Morris; Otterstedt, Ellenbogen & Kammer, LLP

(57) ABSTRACT

A sensory hologram system includes a holographic system generating a holographic image, a sensory imparting system augmenting the holographic image, a detector configured to detect a location of a target, and a processor synchronizing the holographic system and the sensory imparting system based on the location of the target.

10 Claims, 4 Drawing Sheets

(56) References Cited

U.S. PATENT DOCUMENTS

| | | | | |
|---|---|---|---|---|
| 2011/0199587 A1* | 8/2011 | Katou | ............... | G03B 21/142 |
| | | | | 353/85 |
| 2011/0244963 A1* | 10/2011 | Grant | ................. | G06F 3/011 |
| | | | | 463/37 |
| 2012/0113104 A1 | 5/2012 | Jung | | |
| 2013/0085370 A1* | 4/2013 | Friedman | ............. | A61B 3/16 |
| | | | | 600/400 |
| 2013/0301926 A1* | 11/2013 | Eilat | ............. | G06K 9/00355 |
| | | | | 382/195 |
| 2014/0095662 A1* | 4/2014 | Klos | ............. | H04N 21/4307 |
| | | | | 709/217 |

OTHER PUBLICATIONS

Takayuki Hoshi et al., Adding Tactile Reaction to Hologram The 18th IEEE International Symposium on Robot and Human Interactive Communication Toyama, Japan, Sep. 27-Oct. 2, 2009.

* cited by examiner

SENSORY HOLOGRAMS

BACKGROUND

The present disclosure relates to holograms, and more particularly to the projection of sensory holograms.

Holographic images record light information from a scene from a range of directions and create the illusion of a three-dimensional image when viewed in the case of optical holography. Holographic techniques have a variety of applications including art, data storage and security.

BRIEF SUMMARY

According to an exemplary embodiment of the present invention, a sensory hologram system includes a holographic system generating a holographic image, a sensory imparting system augmenting the holographic image, a detector configured to detect a location of a target, and a processor synchronizing the holographic system and the sensory imparting system based on the location of the target.

According to an exemplary embodiment of the present invention, a method of operating a sensory hologram system includes initializing a control program to control a hologram projector to generate a holographic image, detecting a location of a target in a monitored space, determining parameters of a sensory imparting system of the sensory hologram system according to the location of the target in the monitored space, and controlling the sensory imparting system according to the parameters to augment the holographic image.

BRIEF DESCRIPTION OF THE SEVERAL VIEWS OF THE DRAWINGS

Preferred embodiments of the present invention will be described below in more detail, with reference to the accompanying drawings.

DETAILED DESCRIPTION

Described herein are exemplary approaches for creating one or more sensory impressions on a user. According to an exemplary embodiment of the present invention, a viewer's visual perception of the holographic image is augmented by one or more additional sensations. These additional sensations include for example, temperature, pressure, scent, and sound.

According to an exemplary embodiment of the present invention, electromagnetic radiation in the form of laser light is implemented to produce a sensation of pressure and/or heat for a viewer of a holographic image, augmenting the viewer's visual perception of the holographic image.

Other approaches for creating sensory impressions include the use of sound and smell. For example, in one or more exemplary embodiments, directional sound is projected to create an impression that the sound is emanating from the holographic image of a speaker. The sound is synchronized with changes in facial expressions of the holographic image of the speaker, giving the impression that the holographic image of the speaker is speaking more generally, different sounds are used, which are appropriate to a particular hologram. In one or more exemplary embodiments, molecules possessing a scent are released in association with the hologram. For example, in the case of the holographic speaker representing a botanist, the scent of peat is released during the projection of the speaker.

Figure 1:
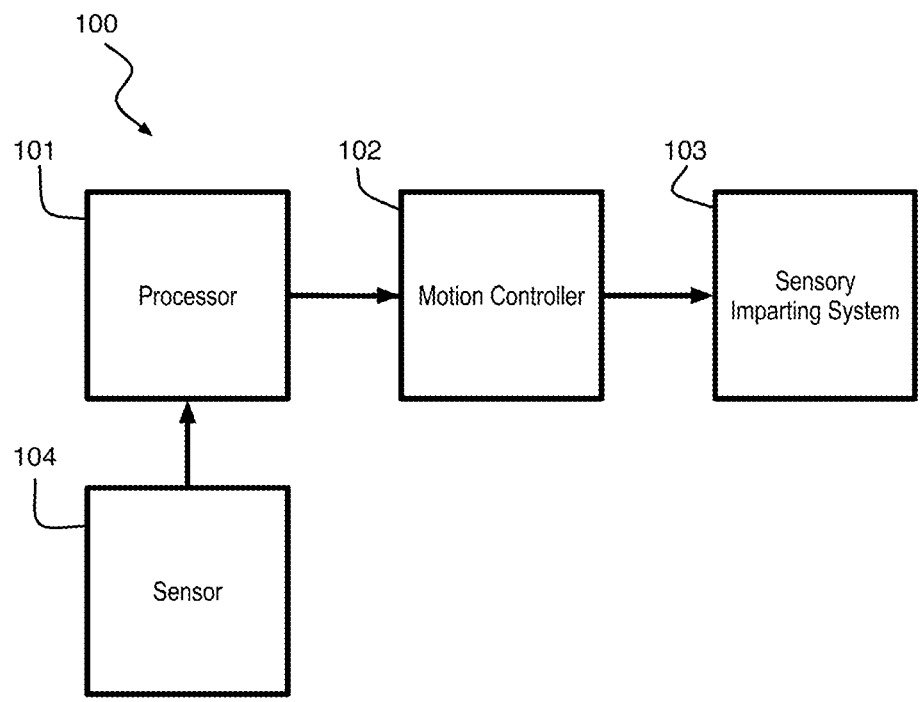
FIG. 1 is a diagram of a system architecture supporting a method for imparting sensory inputs according to an exemplary embodiment of the present invention.

According to an exemplary embodiment of the present invention, a system (100) (see FIG. 1) for creating sensory inputs includes a processor (101), sensory imparting system (103) (for example, a pneumatic air system, a laser system, an audio system, a water misting system, etc.), a servo controlling the sensory imparting system (102), and one or more sensors (104) for detecting and tracking a user within a monitored three-dimensional space.

In the case of pressure, according to an exemplary embodiment of the present invention, the sensory imparting system (103) includes at least one of a laser system. In one example, the laser system includes an argon fluoride (ArF) excimer laser. The ArF excimer laser irradiates the skin of a user at a fluence above an ablation threshold of the skin's surface creating an impression of pressure. Here the ArF excimer laser emits pulses of light at about 193 nanometers (nm). The sense of pressure is due to recoil of a vaporized portion of skin. The sensation can be achieved without heat or pain to the user.

In yet another example of a system configured to create an impression of pressure, the sensory imparting system (103) includes a pneumatic air system configured to emit one or more air streams. These air streams can be emitted by one or more air emitting tubes of the pneumatic air system surrounding a holographic image. In one or more exemplary embodiments, the pneumatic air system includes a compressor and a tank for storing pressurized air. In one or more exemplary embodiments, a sensory hologram system uses a camera or other sensor to detect a person extending their hand to interact with the hologram. Controlled air flows create an impression that the person is touching the hologram as the person's hand reaches an area determined to be occupied by the hologram. In this way, the person feels resistance in region they are touching, giving the impression pressure on the hand and more particularly, the impression of physical contact with the hologram.

In one or more exemplary embodiments, the pneumatic air system is used to deliver molecules possessing a scent. In this example, the pneumatic air system includes a scenting system configured to release an amount of a particular molecule or chemical, for example, a perfume used in conjunction with a holographic image of a person, or a pungent odor used in conjunction with a warning system. For example, these molecules can be injected into an air flow and emitted by one or more air emitters.

In the case of heat, according to an exemplary embodiment of the present invention, long wavelength lasers, e.g., a compact green laser, or heated/cooled air can be implemented to produce a sensation of temperature. Here, the laser energy is absorbed by the skin without ablation. The absorbed laser energy is converted to heat in the skin.

It should be understood that systems other than those explicitly identified herein can be used for imparting sensory inputs. For example, pneumatic air systems, ArF lasers, and far-ultraviolet light laser systems, can be implemented to produce a sense of pressure.

According to an exemplary embodiment of the present invention, the projection of pressure and/or heat is implemented using hardware and software. In one exemplary embodiment the hardware includes an array of air tubes and/or low-power laser emission devices and the software includes a control system for projecting one or more air streams and/or laser beam(s) of the hardware at point objects. In one or more exemplary embodiments, the array is mounted in a room (e.g., on a floor/wall/ceiling), with air/laser emitters located around the area where hologram will appear, such that the action of several streams of air (or of lasers) is combinable to create the impression of pressure as a person touches a hologram (e.g., breaks a plane of the hologram). In one or more exemplary embodiments, in the case of a holographic speaker, the air/laser emitters are mounted on an articulated skeleton device (e.g., movable using the pneumatic air system or a servo system), around which the hologram is projected.

According to an exemplary embodiment of the present invention, the air/laser emitters can be scanned or steered. For example, a laser system can include a scanning mirror, lens or a Micro-Electro-Mechanical System (MEMS), for controlling a scanning motion of a laser beam. In another example, the air stream and/or laser beams can be scanned or steered in a sequential pattern with variable pressure to generate a specific pressure sensation over the surface of the skin. In one or more exemplary embodiments, the system includes a servo-controlled system for positioning a focus of the laser beam or a direction of the air streams. In another example, one or more laser beams are scanned to produce the sensation of warmth on an area of the skin, wherein the size of the area is controlled. This allows the system to function precisely. For example, if the person interacting with the hologram uses only a finger to touch the hologram, rather than the whole hand, the system uses less power to produce the impression of pressure and heat (using lasers and/or air) than if the person used their whole hand.

According to an exemplary embodiment of the present invention, a plurality of laser beams having particular intensities are aimed at one or more point objects. Using the plurality of laser beams, a combined force of pressure and/or heat from laser beams can be determining for any point. A sensor (e.g., a finger) at one such point will sense a certain pressure and/or heat. According to an exemplary embodiment of the present invention, the system determines which laser beams to activate, and at what intensity, so that an approximation of a required sensation of pressure and/or heat is created. The pressure and/or heat dissipate quickly in the area surrounding the sensor, such that any sensation is temporary.

According to an exemplary embodiment of the present invention, a control problem is solved by a control device for determining one or more air streams and/or laser beams to activate, an intensity of each activated air stream and/or laser beam, and in some exemplary cases an orientation of the air stream and/or laser beam. The control problem is solved to allow the remote feeling of pressure and/or heat by a sensor. Suppose several sources (air streams or laser beams) are activated at particular intensities and angles. It is then possible to predict for any nearby point the combined force from the air stream and heat from laser. By determining a location of a sensory (e.g., finger), a certain force can be imparted.

According to an exemplary embodiment of the present invention, pressure and heat are projected in connection with a holographic image, augmenting the holographic image, or another illusion projected by a computing device. In one exemplary embodiment, holographic piano is projected, where a user's interactions, e.g., keystrokes, are determined and a corresponding sound is emitted. In this embodiment, a sensation of touching a key can be achieved using a laser beam to impart the sensation of pressure. In another exemplary embodiment, heat is used to teach music to a user, wherein correct keys are associated with a warm sensation as created by a pneumatic air system.

Figure 2:
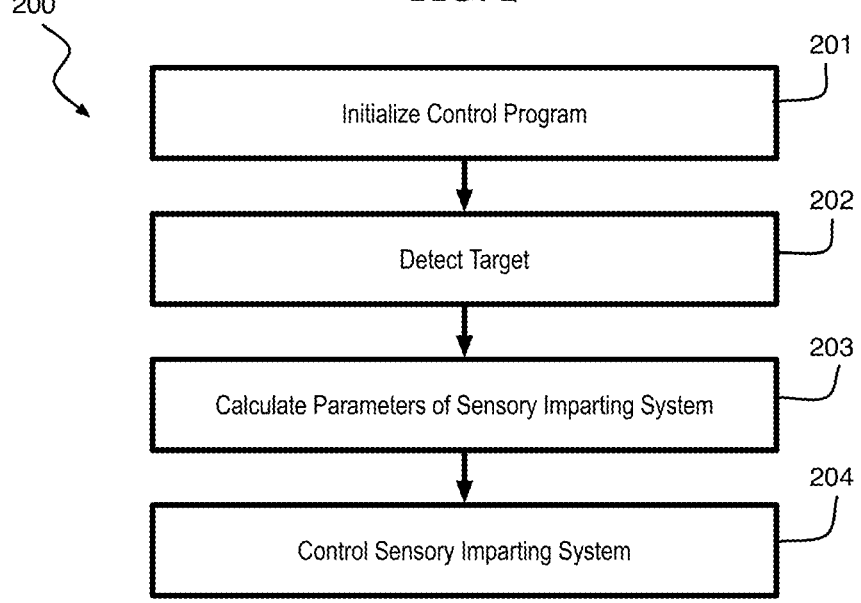
FIG. 2 is a flow diagram of a method for imparting sensory inputs according to an exemplary embodiment of the present invention.

In view of the foregoing, an exemplary method (200) (see FIG. 2) according to an embodiment of the present invention includes initializing a control program (201), detecting a target (202), calculating parameters of the sensory imparting system (203) and controlling the sensory imparting system (204). In one exemplary embodiment, the control program initialization (201) includes loading a program of instructions configured to generate to a desired environment or illusion, e.g., a holographic keyboard. At 202 the system detects one or more targets such as the fingertips of a user using, for example, category-level 3D object detection, pattern recognition methods, or feature-based geometric methods. At 203 the system calculates the parameters of the air and/or laser systems to creating the desired sensory inputs according to the control program. At 204 the system controls the air and/or laser systems according to the calculating parameters to create the desired sensory inputs.

In another exemplary embodiment, a realistic holographic entity is augmented. For example, a projected image of a person can be augmented by sensations of pressure and/or heat imparting the impression of physical touch.

In yet another exemplary embodiment, a physical warning is issued using pressure when an auditory warning is not applicable or cannot be specific enough in a dangerous circumstance. In one example, the sensation of heat can be imparted near an object, warning a person that the object, such as a water/steam pipe, is hot or that an electrical wire is currently live (i.e., conducting electricity). When a person is too close to the object, a sensation of (mild) heat/pressure is produced, causing the person to instinctively react to stop moving toward or to move away from the object. In another example, a person can be warned of obstacles such as parked cars. In particular, the response time (or reaction) to a physical impulse (such as a push) is substantially immediate, whereas an audio warning requires additional processing time (i.e., the listener must hear and understand the audio warning and then react to the warning). Therefore, pressure can be used to notify the person of the existence of the obstacle and also it's location, e.g., by directional control of the sensory imparting hardware. In yet another example, powerful air emitters are used to physically move a person, for example, pushing the person away from the edge of a platform at a railroad or subway station. In yet another example, a strong scent (releasing a particularly pungent chemical), possibly in addition to pressure/heat, gives a powerful impression.

By way of recapitulation, according to an exemplary embodiment of the present invention, a system (100) (see FIG. 1) for creating sensory inputs includes a processor (101), sensory imparting system (103) (for example, an air or laser system), a servo (102) controlling the sensory imparting system (103), and one or more sensor (104) for detecting and tracking a user within a three-dimensional space.

Figure 3:
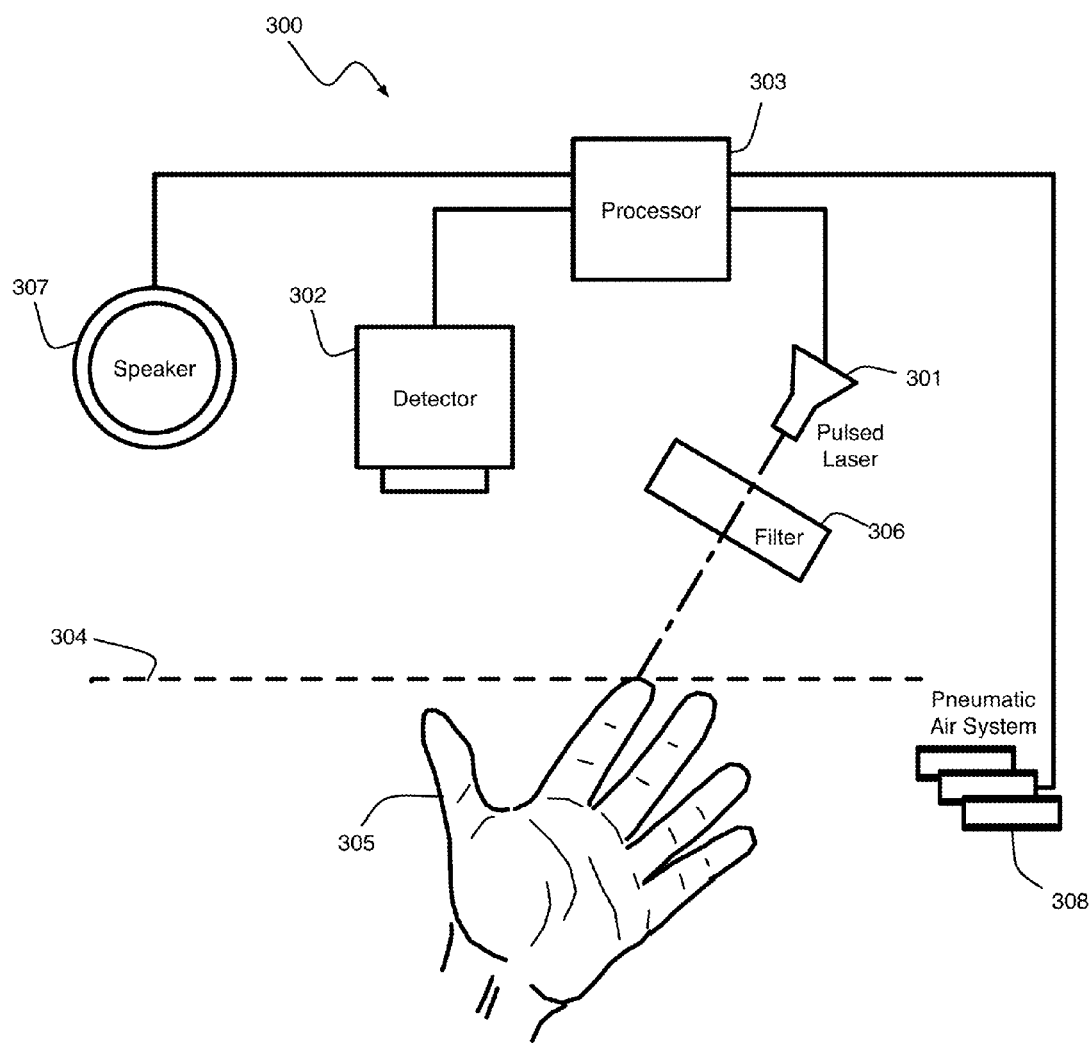
FIG. 3 is a warning system according to an exemplary embodiment of the present invention.

Turning now to exemplary implementations of the aspects described herein; FIG. 3 is an illustrative implementation of a warning system (300) according to an exemplary embodiment of the present invention. In FIG. 3, the warning system (300) includes a pulsed laser (301) or other sensory imparting system, a detector (302) and processor (303). The detector (302) and processor (303) are configured to detect objects (e.g., 305) entering a space (delineated by line 304). According to one embodiment, the detector (302) includes one or more cameras, motion sensors or the like. For example, in the case of the system including one detector, a deformable part-based model is used to reason in 3D. In the exemplary case of the system including multiple detectors, a joint likelihood model (a combination of the output of the different detectors) can be used in conjunction with a detection method. Upon detecting an object (e.g., a hand (305)) entering the space the processor (303) instructs the pulsed laser (301) to strike the object.

In one or more embodiments of the present invention, the warning system (300) of FIG. 3 includes a filter (306) (e.g., a Liquid crystal tunable filter (LCTF) or Acousto Optic Tunable Filter (AOTF)) controlling the emissions of the pulsed laser (301) to create patterns, shapes and the like. For example, such a system can irradiate the fingers of a user to create the impression of a brail pattern/text.

In yet another embodiment of the present invention, the warning system (300) of FIG. 3 includes a speaker (307) configured to produce an audio warning upon detecting an object (e.g., a hand (305)) entering the space (delineated by line 304).

In yet another embodiment of the present invention, the warning system (300) of FIG. 3 includes a pneumatic air system (308) configured to emit one or more air streams. It should be noted that while the pneumatic air system (308) is depicted in FIG. 3 as being in the space (delineated by line 304), one or more of the sensory imparting systems can be disposed in the space or outside of the space.

Figure 4:
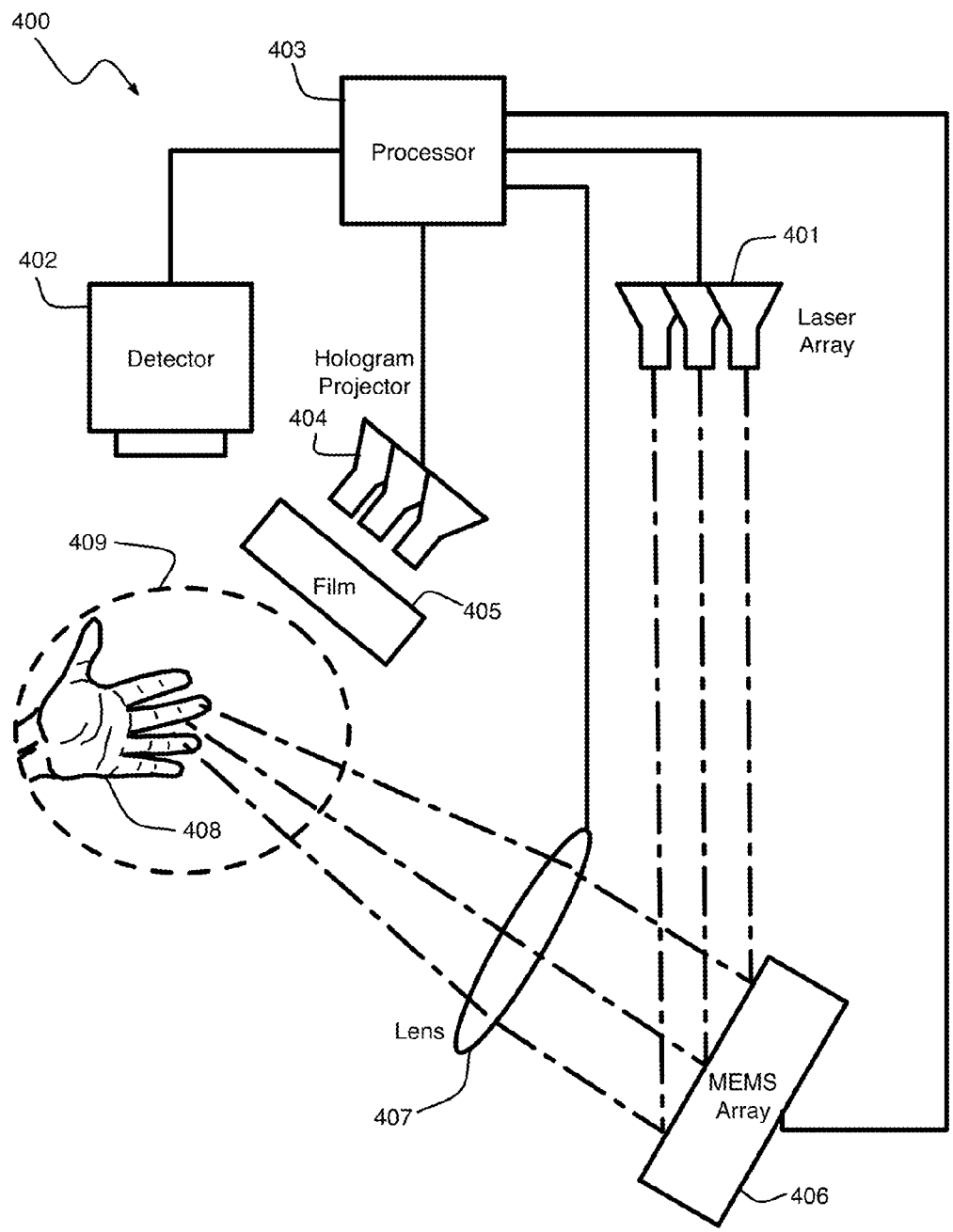
FIG. 4 is an augmented holographic system according to an exemplary embodiment of the present invention.

In another exemplary implementation of the aspects described herein; FIG. 4 is an illustrative implementation of an augmented hologram system (400) according to an exemplary embodiment of the present invention. In FIG. 4 the augmented hologram system (400) includes a pulsed laser array (401), a detector (402), a processor (403), a hologram projector (404), a hologram projection film (405), a MEMS (406) and a focusing lens (407).

In FIG. 4, the hologram projector (404) projects an image on the film (405). According to one or more embodiments of the present invention, the film (405) is a transparent rear projection film. It should be understood that other films can be used, including front type hologram projection films. The MEMS (406) includes optical switches and mirrors configured to redirect or modulate light from the pulsed laser (401). Upon detecting an object (e.g., a hand (408)) entering a monitored three-dimensional space (409) the processor (403) controls the pulsed laser (401) and MEMS 406 to illuminate the object (408) with laser light. The focusing lens (407) can static wherein the MEMS controls the direction of the laser light toward a target or target area. In at least one exemplary embodiment, the focusing lens (407) is controlled by the processor (403) (e.g., using a motion controller, see FIG. 1) to direct the laser light toward a target or target area.

The methodologies of exemplary embodiments of the invention may be particularly well-suited for use in an electronic device or alternative system. Accordingly, embodiments of the present invention may take the form of an entirely hardware embodiment or an embodiment combining software and hardware aspects that may all generally be referred to herein as a "processor," "circuit," "module" or "system."

Furthermore, it should be noted that any of the methods described herein can include an additional step of providing a system for imparting sensory inputs (see for example, FIG. 1) comprising distinct software modules embodied on one or more tangible computer readable storage media. All the modules (or any subset thereof) can be on the same medium, or each can be on a different medium, for example. The modules can include any or all of the components shown in the figures. In a non-limiting example, the modules include a first module that detects a user in a three-dimensional space (see for example, FIG. 1: 104), a second module that derives a solution for a control problem (see for example, FIG. 1: 101); and a third module that tasks a sensory imparting system to achieve a desired sensory input (see for example, FIG. 1: 102). Further, a computer program product can include a tangible computer-readable recordable storage medium with code adapted to be executed to carry out one or more method steps described herein, including the sensory imparting system with the distinct software modules.

Figure 5:
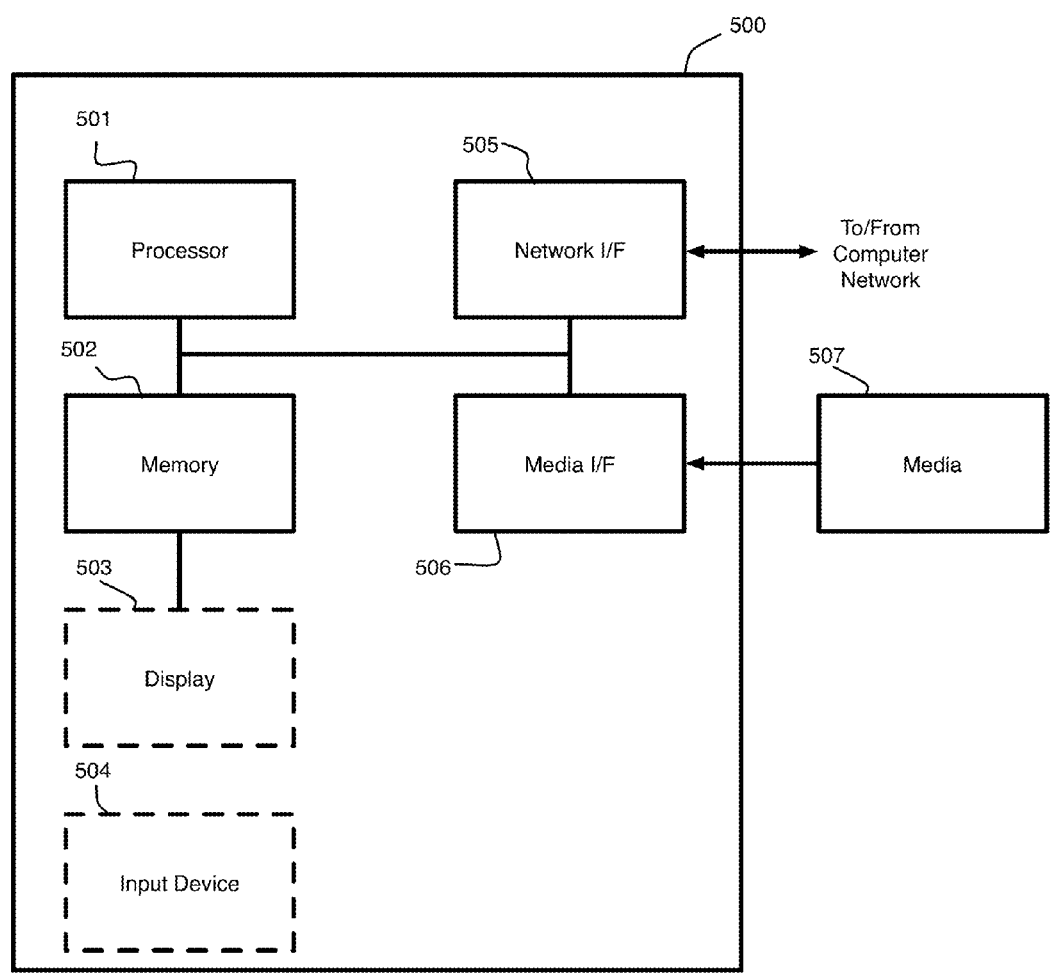
FIG. 5 is a diagram of a system configured to predict service delivery metrics according to an exemplary embodiment of the present invention.

Referring to FIG. 5, FIG. 5 is a block diagram depicting an exemplary computer system for predicting service delivery workloads according to an embodiment of the present invention. The computer system shown in FIG. 5 includes a processor 501, memory 502, display 503, input device 504 (e.g., keyboard), a network interface (I/F) 505, a media IF 506, and media 507, such as a signal source, e.g., camera, Hard Drive (HD), external memory device, etc.

In different applications, some of the components shown in FIG. 3 can be omitted. The whole system shown in FIG. 3 is controlled by computer readable instructions, which are generally stored in the media 507. The software can be downloaded from a network (not shown in the figures), stored in the media 507. Alternatively, a software downloaded from a network can be loaded into the memory 502 and executed by the processor 501 so as to complete the function determined by the software.

The processor 501 may be configured to perform one or more methodologies described in the present disclosure, illustrative embodiments of which are shown in the above figures and described herein. Embodiments of the present invention can be implemented as a routine that is stored in memory 502 and executed by the processor 501 to process the signal from the media 507. As such, the computer system is a general-purpose computer system that becomes a specific purpose computer system when executing one or more exemplary routines of the present invention.

Although the computer system described in FIG. 3 can support methods according to embodiments the present invention, this system is only one example of a computer system. Those skilled of the art should understand that other computer system designs can be used to implement the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although illustrative embodiments of the present invention have been described herein with reference to the accompanying drawings, it is to be understood that the invention is not limited to those precise embodiments, and that various other changes and modifications may be made therein by one skilled in the art without departing from the scope of the appended claims.

What is claimed is:

1. A method of operating a sensory hologram system comprising:
   initializing a control program to control a hologram projector configured to generate a holographic image;
   tracking a location of a target;
   detecting the target entering a monitored space, wherein the target entering the monitored space triggers a warning;
   determining parameters of a sensory imparting system of the sensory hologram system according to the location of the target entering the monitored space; and generating the warning by controlling the hologram projector to generate the holographic image and the sensory imparting system to produce an emission of laser light toward the location of the target entering the monitored space according to the parameters to augment the holographic image.

2. The method of claim 1, further comprising synchronizing, by the sensory hologram system, the hologram projector and the sensory imparting system based on the location of the target.

3. The method of claim 1, further comprising controlling, by the sensory hologram system, the sensory imparting system to produce at least one of pressure and heat sensations using the laser light.

4. The method of claim 3, further comprising controlling, by the sensory hologram system, a micro-electro-mechanical system to scan the laser light across an area of the target, wherein a size of the area scanned by the laser light is controlled by the sensory hologram system.

5. The method of claim 3, further comprising controlling, by the sensory hologram system, a lens to scan the laser light across the target.

6. The method of claim 3, further comprising controlling, by the sensory hologram system, a filter controlling an emission of the laser light toward the target.

7. The method of claim 1, further comprising controlling, by the sensory hologram system, a speaker configured to produce an auditory output.

8. The method of claim 1, further comprising controlling, by the sensory hologram system, a pneumatic air system to emit one or more air streams.

9. The method of claim 8, further comprising controlling, by the sensory hologram system, the pneumatic air system to one of emit a scent in the one or more air streams and heat or cool the one or more air streams.

10. A computer program product for operating a sensory hologram system, the computer program product comprising a computer readable storage medium having program instructions embodied therewith, the program instructions executable by a processor to cause the processor to perform a method comprising:
    initializing a control program to control a hologram projector configured to generate a holographic image;
    tracking a location of a target;
    detecting the target entering a monitored space, wherein the target entering the monitored space triggers a warning;
    determining parameters of a sensory imparting system of the sensory hologram system according to the location of the target entering the monitored space; and
    generating the warning by controlling the hologram projector to generate the holographic image and the sensory imparting system to produce an emission of laser light toward the location of the target entering the monitored space according to the parameters to augment the holographic image.

* * * * *